United States Patent
Huang et al.

(10) Patent No.: US 8,977,201 B1
(45) Date of Patent: Mar. 10, 2015

(54) TECHNIQUES FOR USING NEAR FIELD COMMUNICATION TO ADD A PERSON TO AN EMAIL THREAD

(71) Applicant: Google, Inc., Mountain View, CA (US)

(72) Inventors: Andrew T. Huang, Mountain View, CA (US); Paul T. Westbrook, San Jose, CA (US)

(73) Assignee: Google Inc., Mountain View, CA (US)

( * ) Notice: Subject to any disclaimer, the term of this patent is extended or adjusted under 35 U.S.C. 154(b) by 88 days.

(21) Appl. No.: 13/914,861

(22) Filed: Jun. 11, 2013

(51) Int. Cl.
*H04B 5/00* (2006.01)
*H04W 4/00* (2009.01)

(52) U.S. Cl.
CPC ..................... *H04W 4/008* (2013.01)
USPC ......... 455/41.1; 455/41.2; 455/410; 455/411; 715/733

(58) Field of Classification Search
USPC ............ 455/41.1, 41.2, 410, 411, 412.1, 413; 715/733
See application file for complete search history.

(56) References Cited

U.S. PATENT DOCUMENTS

| | | | |
|---|---|---|---|
| 7,882,244 B2 | 2/2011 | Helvick | |
| 8,805,280 B2 * | 8/2014 | Wakasa et al. | 455/41.2 |
| 2008/0209329 A1 * | 8/2008 | DeFranco et al. | 715/733 |
| 2008/0230615 A1 | 9/2008 | Read et al. | |
| 2009/0193500 A1 | 7/2009 | Griffin et al. | |
| 2011/0070826 A1 | 3/2011 | Griffin et al. | |
| 2011/0070829 A1 | 3/2011 | Griffin et al. | |
| 2011/0081923 A1 | 4/2011 | Forutanpour et al. | |
| 2011/0264745 A1 * | 10/2011 | Ferlitsch | 709/205 |
| 2012/0303429 A1 * | 11/2012 | Nolledo et al. | 705/14.16 |
| 2014/0104033 A1 * | 4/2014 | Griffiths et al. | 340/4.3 |
| 2014/0173269 A1 * | 6/2014 | Varoglu et al. | 713/150 |

* cited by examiner

*Primary Examiner* — Minh D Dao
(74) *Attorney, Agent, or Firm* — Remarck Law Group PLC

(57) ABSTRACT

A computer-implemented method for communication between a first mobile device and a second mobile device using near field communication (NFC) is presented. The method includes determining, at the first mobile device, whether NFC is enabled with the second mobile device. The method includes determining, at the first mobile device, whether a share command has been initiated, the share command associated with an email to be shared with the second mobile device. The method includes sending a first identifier from the first mobile device to the second mobile device via an NFC transmission. The method includes receiving, at the first mobile device, a second identifier from the second mobile device, the second identifier comprising user information related to (i) a second user and (ii) the email to be shared. The method includes associating the second user as a recipient to the email to be shared.

20 Claims, 6 Drawing Sheets

TECHNIQUES FOR USING NEAR FIELD COMMUNICATION TO ADD A PERSON TO AN EMAIL THREAD

FIELD

The present disclosure relates to mobile devices and, more particularly, to techniques for communication between a first mobile device and a second mobile device using near field communication (NFC) to add a person to an email thread.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A "mobile device" refers to a computing device that typically includes a user interface, a display, and a processor. Example mobile devices include laptop computers, tablet computers, mobile phones and the like. Mobile devices may selectively communicate via one or more networks such as a mobile telephone network, and the Internet. Additionally or alternatively, mobile devices may selectively communicate with other mobile devices. One technique for communication between two or more mobile devices is near field communication (NFC). Specifically, NFC may be used to transfer various forms of data between two or more mobile devices arranged in close proximity. For example, this data may include data such as audio, video, and photos.

In some instances, mobile devices may be used to send and receive email. In some examples, an originating email may evolve into many emails back and forth between two or more recipients, hereinafter referred to as an "email thread". Sometimes during the progression of such dialogue, it may be desirable to add another recipient to the email thread.

SUMMARY

A computer-implemented method for communication between a first mobile device and a second mobile device using near field communication (NFC) is presented. The method includes determining, at the first mobile device, whether NFC is enabled with the second mobile device. When NFC is enabled with the second mobile device, the method includes determining, at the first mobile device, whether a share command has been initiated, the share command associated with an email to be shared with the second mobile device. When the share command has been initiated, the method includes sending a first identifier from the first mobile device to the second mobile device via an NFC transmission, the first identifier comprising user information related to (i) a first user and (ii) the email to be shared. The method includes receiving, at the first mobile device, a second identifier from the second mobile device, the second identifier comprising user information related to (i) a second user and (ii) the email to be shared. When the second identifier has been received at the first mobile device, the method includes associating the second user as a recipient to the email to be shared.

In some embodiments, associating further comprises forwarding the email to be shared to the second mobile device.

In other embodiments, associating further comprises identifying the second user as a recipient on a subsequent email associated with the email to be shared.

In other embodiments, sending the first identifier further comprises providing, via a display of the first mobile device, a request to share the email to be shared.

In other embodiments, sending the first identifier further comprises sending a command to the second mobile device to launch an email application.

In some embodiments, determining whether NFC is enabled includes determining, at the first mobile device, whether the second mobile device is within range for NFC with the first mobile device.

Another computer-implemented method is also presented. The method includes receiving, at a network server, a command to send a conversation token from a second mobile device to a first mobile device, the conversation token comprising user information related to the second user and an email to be shared, the command being sent by the second mobile device in response to the second mobile device receiving a uniform resource identifier (URI) from the first mobile device via an NFC transmission. When the command is received, the method includes sending the conversation token to the first mobile device. The method includes receiving authorization from the first mobile device to add a second user to a thread of the email to be shared, the thread having identified email recipients including the first user and at least one other recipient. When authorization is received, the method includes sending the email to be shared to the second mobile device. The method includes sending a notification email to the at least one other recipient of the email thread that the second user has been added.

A computing device is also presented. The computing device includes a display, one or more processors coupled to the display, and a non-transitory computer-readable storage medium storing executable computer program code, the at least one or more processors configured to execute the executable computer program code to perform operations including determining, at the first mobile device, whether near field communication (NFC) is enabled with the second mobile device. A computer-implemented method for communication between a first mobile device and a second mobile device using near field communication (NFC) is presented. The method includes determining, at the first mobile device, whether NFC is enabled with the second mobile device. When NFC is enabled with the second mobile device, the computing device determines, at the first mobile device, whether a share command has been initiated, the share command associated with an email to be shared with the second mobile device. When the share command has been initiated, the computing device sends a first identifier from the first mobile device to the second mobile device via an NFC transmission, the first identifier comprising user information related to (i) a first user and (ii) the email to be shared. The computing device receives, at the first mobile device, a second identifier from the second mobile device, the second identifier comprising user information related to (i) a second user and (ii) the email to be shared. When the second identifier has been received at the first mobile device, the computing device associates the second user as a recipient to the email to be shared.

In some embodiments, operations further include (i) determining, at the first mobile device, whether the second mobile device is within range for NFC with the first mobile device; and (ii) sending the first identifier when the second mobile device is within range for NFC.

Another computing device is also presented. The computing device includes a network server having one or more processors, the at least one processor configured to execute the executable computer program code to perform operations including receiving, at the network server, a command to send a conversation token from a second mobile device to the first mobile device. The conversation token comprises user information related to the second user and an email to be shared, the command being sent by the second mobile device in response to the second mobile device receiving a uniform resource identifier (URI) from the first mobile device regarding a first user via an NFC transmission. The computing device sends the conversation token to the first mobile device. The computing device receives authorization from the first mobile device to add a second user to a thread of the email to be shared, the thread having identified email recipients including the first user and at least one other recipient. The computing device sends the email to be shared to the second mobile device. The computing device sends a notification email to the at least one other recipient of the email thread that the second user has been added.

Further areas of applicability of the present disclosure will become apparent from the detailed description provided hereinafter. It should be understood that the detailed description and specific examples are intended for purposes of illustration only and are not intended to limit the scope of the disclosure. For example, while the present disclosure is described with respect to NFC, it should be appreciated that the techniques of the present disclosure can be implemented using short-range wireless communication mediums other than NFC (Bluetooth, WiFi Direct, etc.).

BRIEF DESCRIPTION OF THE DRAWINGS

The present disclosure will become more fully understood from the detailed description and the accompanying drawings, wherein.

DETAILED DESCRIPTION

Figure 1:
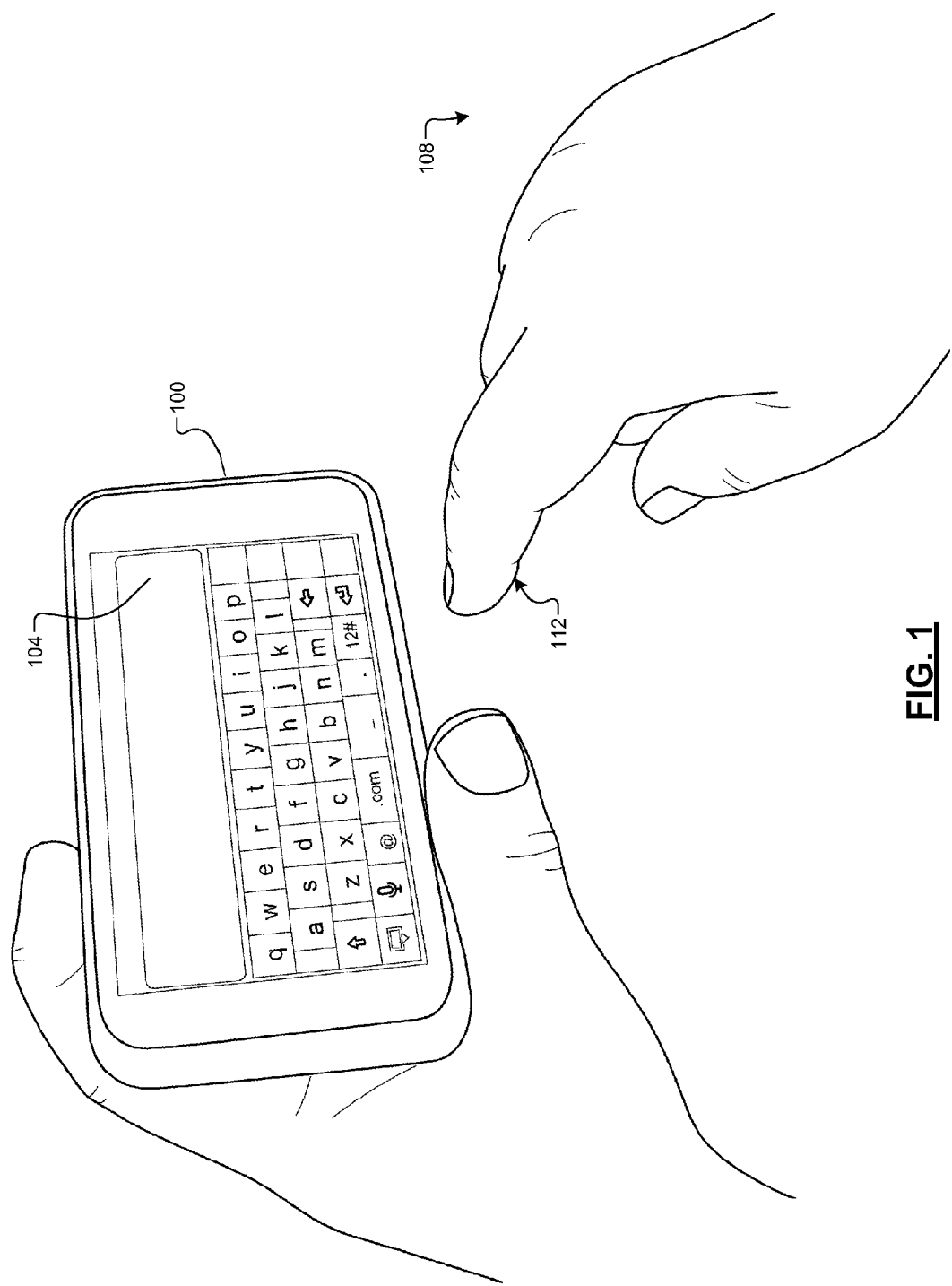
FIG. 1 is a schematic illustration of a user interacting with a mobile device according to some implementations of the present disclosure.

Referring now to FIG. 1, a schematic illustration of interaction between a user 108 and a mobile device 100 is shown. As previously described, the mobile device 100 may be a mobile phone, a tablet computer, or the like. The mobile device 100 generally includes a display 104, for example, a touch display as shown. The mobile device 100 may additionally or alternatively include a physical character layout, e.g., a partial QWERTY-based keyboard. The touch display 104 may display information to and receive input from a user 108. For example, the user 108 may input information to the mobile device 100 via the touch display 104 using one or more fingers 112.

Figure 2:
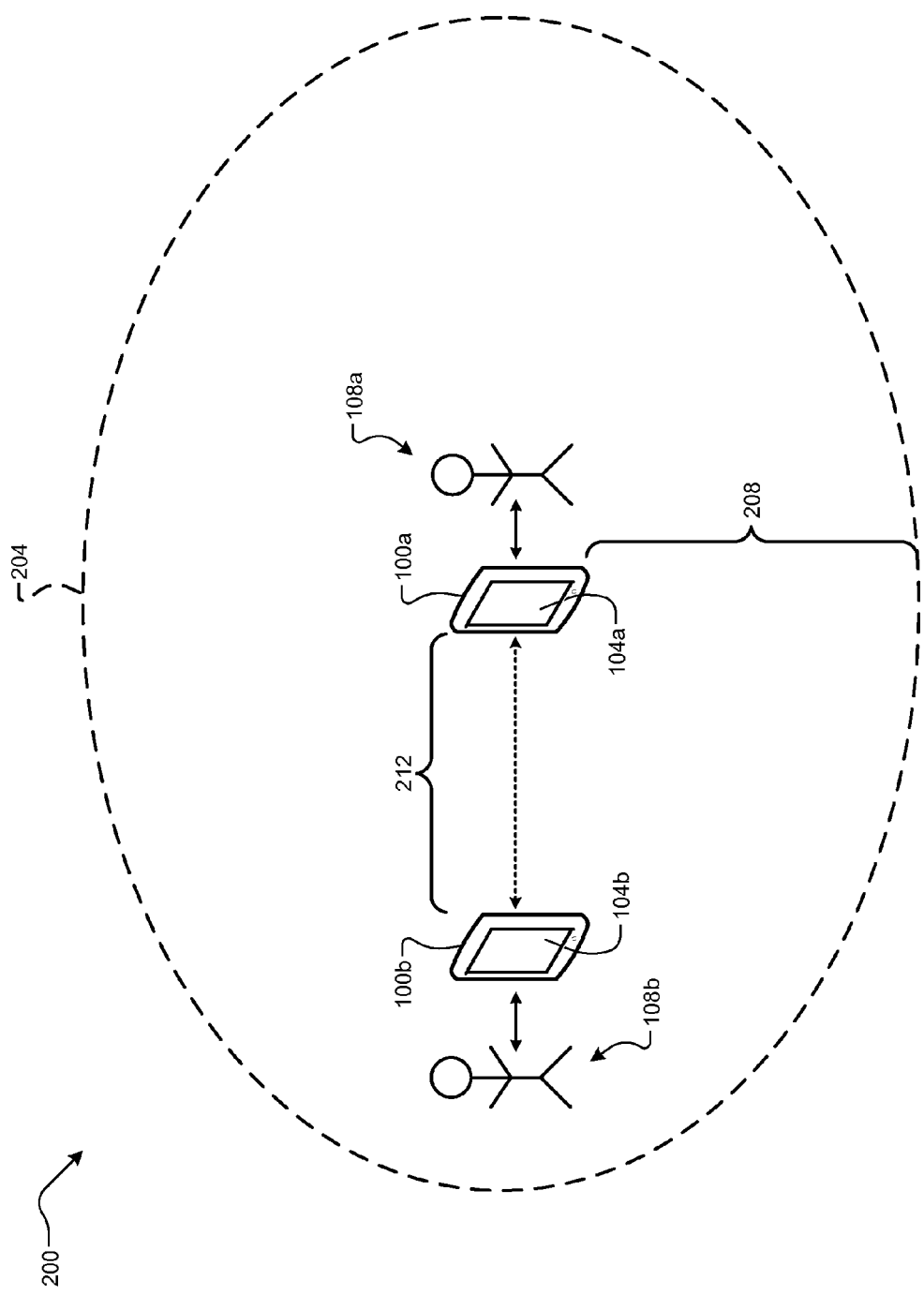
FIG. 2 is a schematic illustration of two mobile devices interacting via near field communication (NFC) according to some implementations of the present disclosure.

Referring now to FIG. 2, a schematic illustration of a near field communication (NFC) system 200 is shown. The NFC system 200 generally includes a first mobile device 100a and a second mobile device 100b, which are operated and transported by a first user 108a and a second user 108b, respectively. While two mobile devices are shown, one of the mobile devices may be a non-portable or stationary user device. One of the two devices, however, is typically a mobile device because one device has to be brought into range for NFC with the other device. The first mobile device 100a and the second mobile device 100b may also have a first touch display 104a and a second touch display 104b, respectively.

In order to establish NFC between the first mobile device 100a and the second mobile device 100b, the first mobile device 100a (the "initiator") initiates communication with the second mobile device 100b (the "target"). Specifically, the first mobile device 100a may generate an electromagnetic field 204 using radio frequency (RF) waves. For example, the RF waves may have a frequency of approximately 13.56 megahertz (MHz) within a bandwidth of approximately 14 kilohertz (kHz). Other frequency ranges, however, may also be used.

The electromagnetic field 204 extends outwardly from the first mobile device 100a for a first distance 208. The electromagnetic field 204, therefore, may cover an area defined by the first distance 208. For example, the first distance 208 to achieve a successful NFC transmission may be approximately 20 centimeters (cm). NFC transmissions at the first distance 208, however, may be inconsistent and therefore may suffer from data loss. Therefore, a second distance 212 may be desired for more effective NFC transmission, the second distance 212 being shorter than the first distance 208. For example, the second distance 212 may be approximately 4 cm.

When the second mobile device 100b is brought within the electromagnetic field 204, e.g., by the second user 108b, the second mobile device 100b may behave according to one of two operating modes. In a passive operating mode, the second mobile device 100b modulates a load to communicate back to the first mobile device 100a. In an active mode, on the other hand, the second mobile device 100b alternates with the first mobile device 100a in generating the electromagnetic field 204. In other words, during the active mode only one of the first mobile device 100a and the second mobile device 100b is generating the electromagnetic field 204 at a given time while the other mobile device waits for data.

While the present disclosure is described with respect to NFC, it should be appreciated that the techniques of the present disclosure can be implemented using short-range wireless communication mediums other than NFC (Bluetooth, WiFi Direct, etc.).

Figure 3:
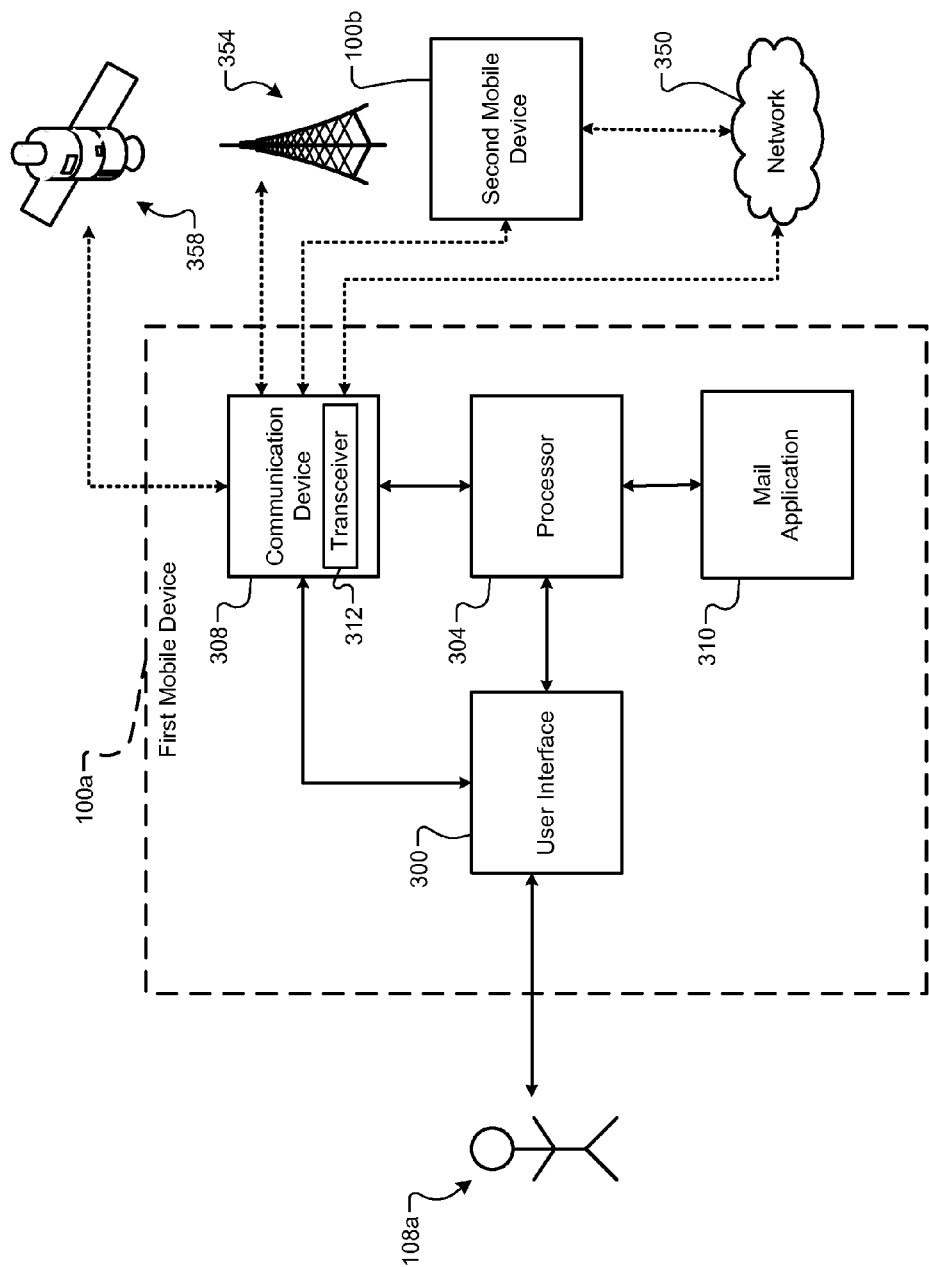
FIG. 3 is a functional block diagram of one of the mobile devices of FIG. 2 according to some implementations of the present disclosure.

Referring now to FIG. 3, an example of the first mobile device 100a is shown in more detail. The first mobile device 100a may include the first touch display 104a (FIG. 2) having a user interface 300. The first touch display 104a can further include one or more processors 304, a communication device 308, and a mail application 310. The communication device 308 can further include a transceiver 312. While these components are shown and described herein, the first mobile device 100a may also include other suitable computing components, such as memory. Furthermore, while an example of the first mobile device 100a is shown, the second mobile device 100b may also have the same or similar components as the first mobile device 100a.

The first user 108a can communicate with the first mobile device 100a via the first touch display 104a. In particular, the first touch display 104a may display information to and receive input from the first user 108a. Specifically, the user interface 300 may generate or manipulate the information to be displayed to the first user 108a via the first touch display 104a. The user interface 300 may also interpret the input received from the first user 108a via the first touch display 104a. The user interface 300 may receive information from and communicate information to both of the processor 304 and the communication device 308.

The processor 304 may control most operations of the first mobile device 100a. The processor 304, therefore, may communicate with each of the user interface 300, the communication device 308, and the mail application 310. For example, the processor 304 may perform tasks such as, but not limited to, loading/controlling an operating system of the first mobile device 100a, loading/configuring communication parameters for the communication device 308 and/or the transceiver 312, controlling parameters of the user interface module 300, loading/controlling software applications, and controlling memory storage/retrieval operations, e.g., for loading of the various parameters.

The communication device 308 controls communication between the first mobile device 100a and other devices. For example only, the communication device 308 may provide for communication between the first mobile device 100a and other users associated with the first user 108a and/or the Internet. The communication device 308 may enable the first mobile device 100a to communicate via one or more of three communication mediums: a computing network or network server 350 (hereinafter "the network 350"), e.g., the Internet, a mobile telephone network 354, and a satellite network 358. Other communication mediums may also be implemented, e.g., NFC (see below).

The transceiver 312 may control NFC between the first mobile device 100a and other devices, such as the second mobile device 100b. While the transceiver 312 is shown incorporated into the communication device 308, the transceiver 312 may comprise a separate NFC module. The transceiver 312 may determine whether another device, e.g., the second mobile device 100b, is in range for NFC transmission. For example, as previously described, another device may be in range for NFC transmission when it is within a predetermined distance, e.g., 4 cm, from the first mobile device 100a. The first mobile device 100a may then transmit information to or receive information from another device, e.g., the second mobile device 100b.

Figure 4:
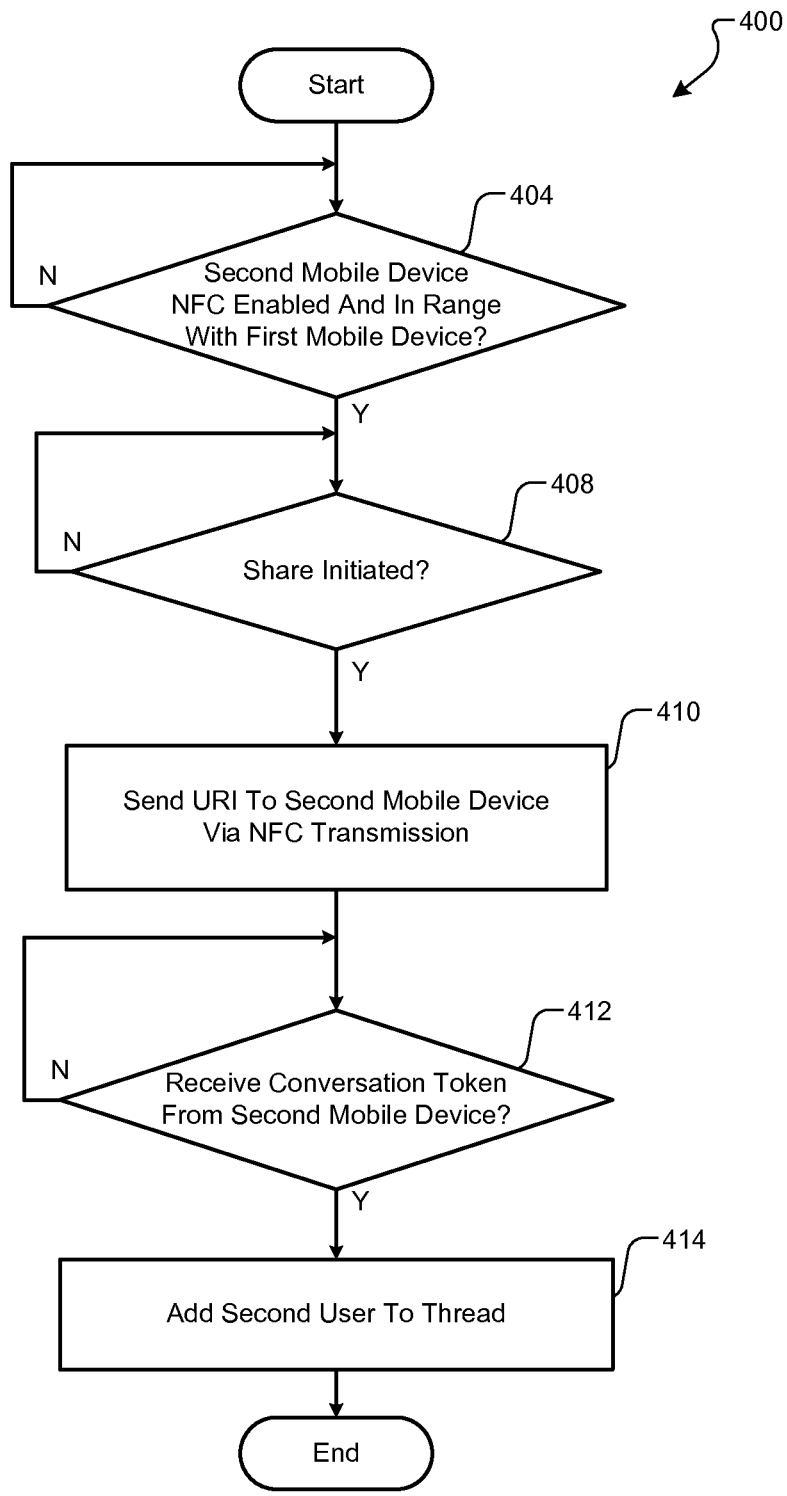
FIG. 4 is a flow diagram of a technique for communicating with a second mobile device from a first mobile device using NFC.
Figure 5:
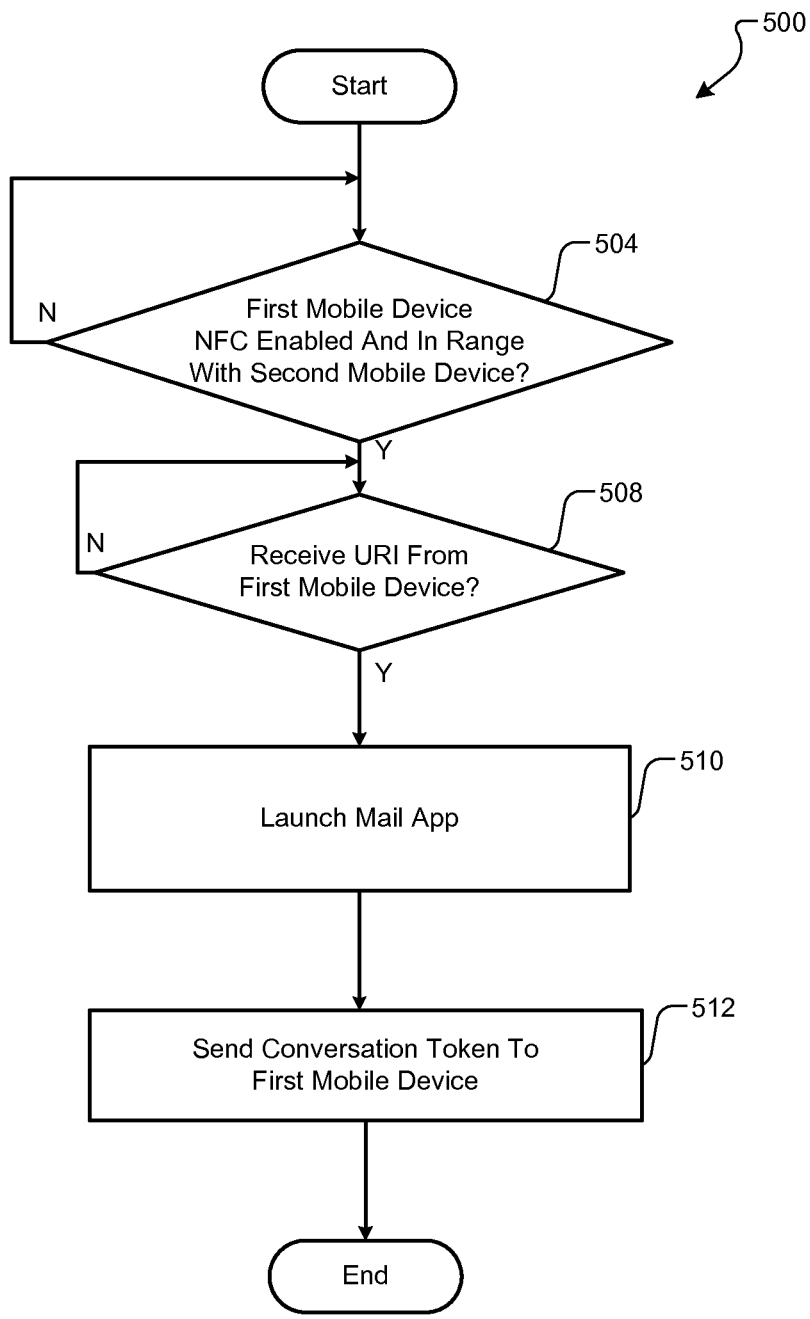
FIG. 5 is a flow diagram of a technique for communicating with a first mobile device from a second mobile device using NFC.
Figure 6:
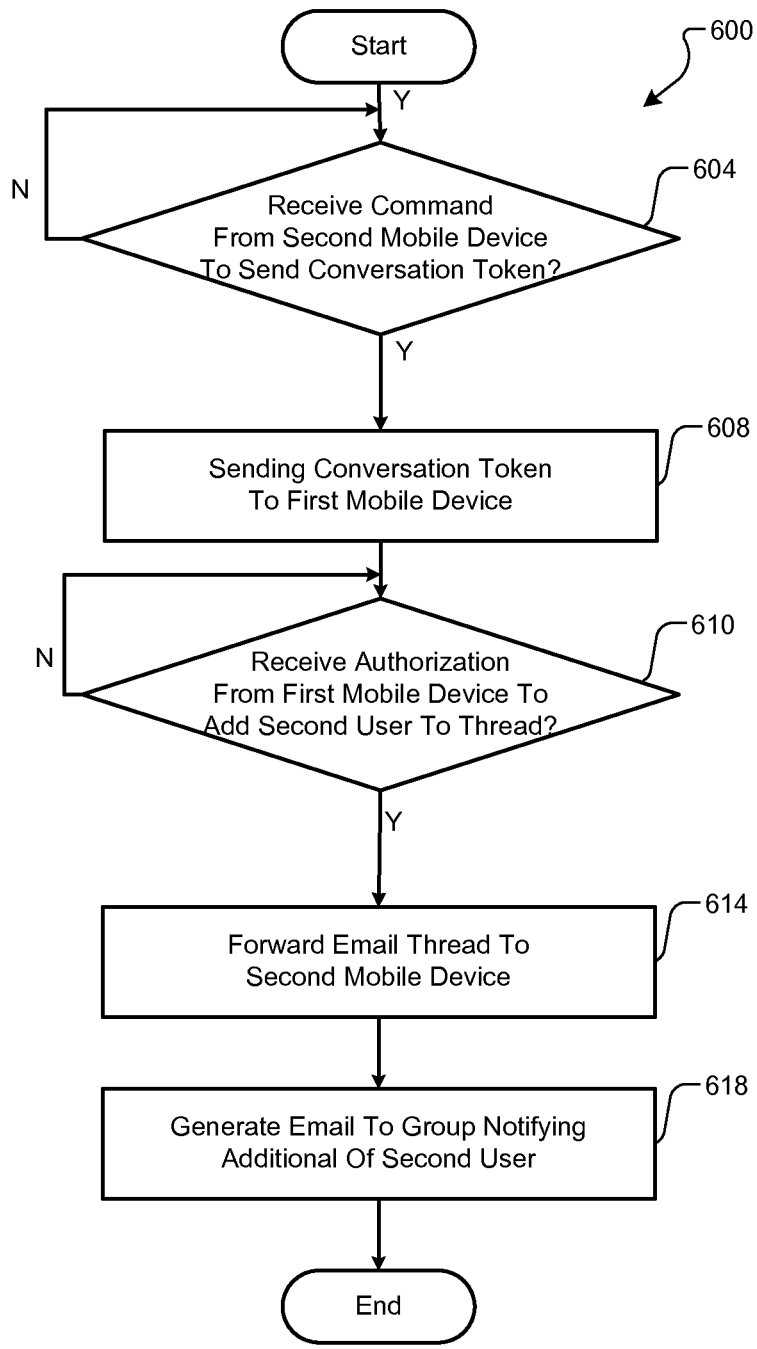
FIG. 6 is a flow diagram of a technique for communicating with a first and second mobile device from a network server.

FIGS. 4-6 illustrate various techniques that may be implemented to add a person to an email thread using NFC communication. As described herein, the following techniques may be implemented when a party of an existing email thread (first user) desires to include someone, who is not already a party of the email thread (second user), onto an existing email thread. The techniques utilize NFC to send contact information regarding the second user, from the second device to the first device and initiate the inclusion of the second user onto the email thread. In this regard, the inconvenience of inputting the second user's email address such as by manually typing it using the first touch display 104a can be avoided. Specifically, FIG. 4 illustrates a technique that may be implemented by the first mobile device to share an email thread with a second user that is using a second mobile device. FIG. 5 illustrates a technique that may be implemented by the second mobile device to request inclusion onto an email thread to which the first user is already a party. FIG. 6 illustrates a technique that may be implemented by a network server that communicates with the first and second mobile devices to include the second user onto an email thread with the first user.

Referring now to FIG. 4, an example of a technique 400 for using a first mobile device 100a to communicate with a second mobile device 100b using NFC transmission is illustrated. At 404, the communication device 308 determines whether the second mobile device 100b is enabled and is within range for NFC with the first mobile device 100a. If so, control may proceed to 408. If not, the technique 400 may return to 404. At 408, the communication device 308 determines whether a share command has been initiated. In some examples, the processor 304 may prompt the first user, such as through the first touch display 104a of the user interface 300, to authorize the sharing of the email. In one example, a menu may be provided on the first touch display 104a. The share command can represent the desire of the first user 108a to share an email thread with a second user 108b that is not already a recipient of the email thread. If share has been initiated, the technique 400 may proceed to 410. If not, the technique 400 may return to 408. At 410, the communication device 308 sends a uniform resource indicator (URI) to the second mobile device 100b via an NFC transmission. In some examples, the URI may contain information related to the first user 108a such as an email address, and information indicative of the email to be shared. The information indicative of the email to be shared can include, for example, the original email and/or an identifier of the email to be shared. In other examples, the URI may also contain instructions or commands for the second mobile device 104b to launch an email application. At 412, the communication device 308 determines whether a conversation token has been received from the second user 108b. If not, the technique 400 may return to 412. If it has, the technique 400 may proceed to 414. At 414, the second user 108b is associated with or added to a thread of the email to be shared. In addition, a notification can be generated that the second user 108b has been added to a recipient list of an email thread. Furthermore, some or all of the previous emails of the email thread may be sent to the second user 108b.

The conversation token received from the second user 108b can include the URI and information indicative of the second user 108b. In this manner, the first mobile device 100a can confirm the intent of the first user 108a to share the identified email with the second user 108b, e.g., by comparing the URI sent to the second mobile device 100b to the URI received from the second mobile device 100b. The conversation token can be generated by the second mobile device 100b directly, or be generated remotely from the second mobile device 100b. For example only, the conversation token can be generated at a server or other computing device in communication with first and second mobile devices 100a, 100b via network 350. In this example, the server or other computing device can receive information from the second mobile device 100b (such as the URI and an identification of the second user 108b) that is utilized to generate the conversation token.

Turning now to FIG. 5, an example of a technique 500 for communicating from a second mobile device to a first mobile device via NFC communication is illustrated. At 504, the communication device 308 determines whether NFC is enabled on the first mobile device 100a and in range with the second mobile device 100b. If so, the technique 500 proceeds to 508. If not, the technique 500 may return to 504. At 508, the second mobile device 100b determines if the URI has been received from the first mobile device 100a. If so, the technique 500 may proceed to 510. If not, the technique 500 may return to 508. At 510, the second mobile device 100b may launch an email application. At 512, the second mobile device 100b sends the conversation token to the first mobile device. As described above, the conversation token can include the received URI and information indicative of the second user 108b.

Referring now to FIG. 6, an example of a technique 600 for communicating with a first and second mobile device 100a, 100b from a network server is illustrated. At 604, the network 350 determines whether a command from the second mobile device 100b to send a conversation token to the first mobile device 100a has been received. If so, the technique 600 may proceed to 608. If not, the technique 600 may return to 604. At 608, the network 350 can send the conversation token to the first mobile device. At 610, the network 350 determines whether an authorization from the first mobile device 100a to add the second user to an email thread has been received. If so, the technique 600 may proceed to 614. If not, the technique 600 may return to 610. At 614, the network 350 may forward the email thread to the second mobile device 100b. At 618, the network 350 can generate an email to each user on the email thread notifying of the addition of the second user.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for communication between a first mobile device and a second mobile device using a short-range wireless communication medium, the method comprising:
   determining, at the first mobile device, whether communication with the second mobile device via the short-range wireless communication medium is enabled;
   determining, at the first mobile device, whether a share command has been initiated, the share command associated with an email to be shared with the second mobile device;
   sending a first identifier from the first mobile device to the second mobile device via the short-range wireless communication medium based on the share command being initiated, the first identifier comprising user information related to (i) a first user and (ii) the email to be shared;
   receiving, at the first mobile device, a second identifier from the second mobile device, the second identifier comprising user information related to (i) a second user and (ii) the email to be shared; and
   associating the second user as a recipient to the email to be shared based on receiving the second identifier.

2. The computer-implemented method of claim 1, wherein the associating further comprises forwarding the email to be shared to the second mobile device.

3. The computer-implemented method of claim 1, wherein the associating further comprises identifying the second user as a recipient on a subsequent email associated with the email to be shared.

4. The computer-implemented method of claim 1, wherein sending the first identifier further comprises providing, via a display of the first mobile device, a request to share the email to be shared.

5. The computer-implemented method of claim 1 wherein sending the first identifier further comprises sending a command to the second mobile device to launch an email application.

6. The computer-implemented method of claim 1, wherein determining whether communication with the second mobile device via the short-range wireless communication medium is enabled includes determining, at the first mobile device, whether the second mobile device is within range for communication with the first mobile device via the short-range wireless communication medium.

7. The computer-implemented method of claim 1, wherein the short-range wireless communication medium is near field communication (NFC).

8. The computer-implemented method of claim 1, wherein the short-range wireless communication medium is Bluetooth.

9. The computer-implemented method of claim 1, wherein the short-range wireless communication medium is WiFi Direct.

10. A computer-implemented method comprising:
    receiving, at a network server, a command to send a conversation token from a second mobile device to a first mobile device, the first and second mobile devices associated with first and second users, respectively, the conversation token comprising user information related to the second user and an email to be shared, the command being sent by the second mobile device in response to the second mobile device receiving a uniform resource identifier (URI) from the first mobile device regarding a first user via transmission short-range wireless communication medium;
    sending the conversation token to the first mobile device;
    receiving authorization from the first mobile device to add the second user to a thread of the email to be shared, the thread having identified email recipients including the first user and at least one other recipient; and
    sending the email to be shared to the second mobile device; and
    sending a notification email to the at least one other recipient of the email thread that the second user has been added.

11. The computer-implemented method of claim 10, wherein the short-range wireless communication medium is near field communication (NFC).

12. The computer-implemented method of claim 10, wherein the short-range wireless communication medium is one of Bluetooth and WiFi Direct.

13. A first mobile device comprising:
    one or more processors; and
    a non-transitory computer-readable storage medium storing executable computer program code, the at least one or more processors configured to execute the executable computer program code to cause the first mobile device to perform operations including:
        determining whether communication with a second mobile device via a short-range wireless communication medium is enabled;

determining whether a share command has been initiated, the share command associated with an email to be shared with the second mobile device;

sending a first identifier to the second mobile device via the short-range wireless communication medium based on the share command being initiated, the first identifier comprising user information related to (i) a first user and (ii) the email to be shared;

receiving a second identifier from the second mobile device, the second identifier comprising user information related to (i) a second user and (ii) the email to be shared; and associating the second user as a recipient to the email to be shared based on receiving the second identifier.

14. The first mobile device of claim 13, wherein the operations further include (i) determining whether the second mobile device is within range for communication with the first mobile device via the short-range wireless communication medium; and (ii) sending the first identifier when the second mobile device is within range for communication with the first mobile device via the short-range wireless communication medium.

15. The first mobile device of claim 13, wherein the short-range wireless communication medium is near field communication (NFC).

16. The first mobile device of claim 13, wherein the short-range wireless communication medium is Bluetooth.

17. The first mobile device of claim 13, wherein the short-range wireless communication medium is WiFi Direct.

18. A network server comprising:
one or more processors; and
a non-transitory computer-readable storage medium storing executable computer program code, the one or more processors configured to execute the executable computer program code to cause the network server to perform operations including:

receiving a command to send a conversation token from a second mobile device to a first mobile device, the first and second mobile devices associated with first and second users, respectively, the conversation token comprising user information related to the second user and an email to be shared, the command being sent by the second mobile device in response to the second mobile device receiving a uniform resource identifier (URI) from the first mobile device via a short-range wireless communication medium;

sending the conversation token to the first mobile device;

receiving authorization from the first mobile device to add the second user to a thread of the email to be shared, the thread having identified email recipients including the first user and at least one other recipient;

sending the email to be shared to the second mobile device; and sending a notification email to the at least one other recipient of the email thread that the second user has been added.

19. The network server of claim 18, wherein the short-range wireless communication medium is near field communication (NFC).

20. The network server of claim 18, wherein the short-range wireless communication medium is one of Bluetooth and WiFi Direct.

* * * * *